United States Patent [19]

Nigrini et al.

[11] Patent Number: 4,714,112
[45] Date of Patent: Dec. 22, 1987

[54] METHOD FOR CONTROLLING ROCK DISSOLUTION AND PIPE CORROSION DURING OIL WELL STEAM INJECTION

[75] Inventors: Andrew Nigrini, La Habra Heights; Liming Hsueh, Buena Park, both of Calif.

[73] Assignee: Chevron Research Company, San Francisco, Calif.

[21] Appl. No.: 65,198

[22] Filed: Jun. 22, 1987

Related U.S. Application Data

[63] Continuation of Ser. No. 848,662, Apr. 4, 1986, abandoned, which is a continuation-in-part of Ser. No. 728,063, Apr. 29, 1985, and a continuation-in-part of Ser. No. 654,331, Sep. 24, 1984, abandoned.

[51] Int. Cl.$^4$ .................. E21B 43/22; E21B 47/00; E21B 47/06
[52] U.S. Cl. .................. 166/252; 166/272; 166/303; 166/902
[58] Field of Search ............ 166/272, 303, 250, 252, 166/902; 122/459

[56] References Cited

U.S. PATENT DOCUMENTS

| | | | |
|---|---|---|---|
| 3,476,183 | 11/1969 | Haynes, Jr. et al. | 166/272 |
| 4,068,716 | 1/1978 | Allen | 166/272 X |
| 4,475,595 | 10/1984 | Watkins et al. | 166/303 |
| 4,476,930 | 10/1984 | Watanabe | 166/902 X |
| 4,572,296 | 2/1986 | Watkins | 166/303 |

*Primary Examiner*—George A. Suchfield
*Attorney, Agent, or Firm*—S. R. LaPaglia; E. J. Keeling

[57] ABSTRACT

A method of inhibiting the dissolution of the gravel pack and silicate- or carbonate-containing formations subjected to steam-enhanced oil recovery processes while inhibiting the corrosion of mild steel. The method includes the controlled addition of a salt to the steam feed water to maintain the pH of the residual liquid phase in the range of from 8 to 10. Preferred salts are ammonium salts, such as ammonium sulfate and ammonium chloride.

38 Claims, 2 Drawing Figures

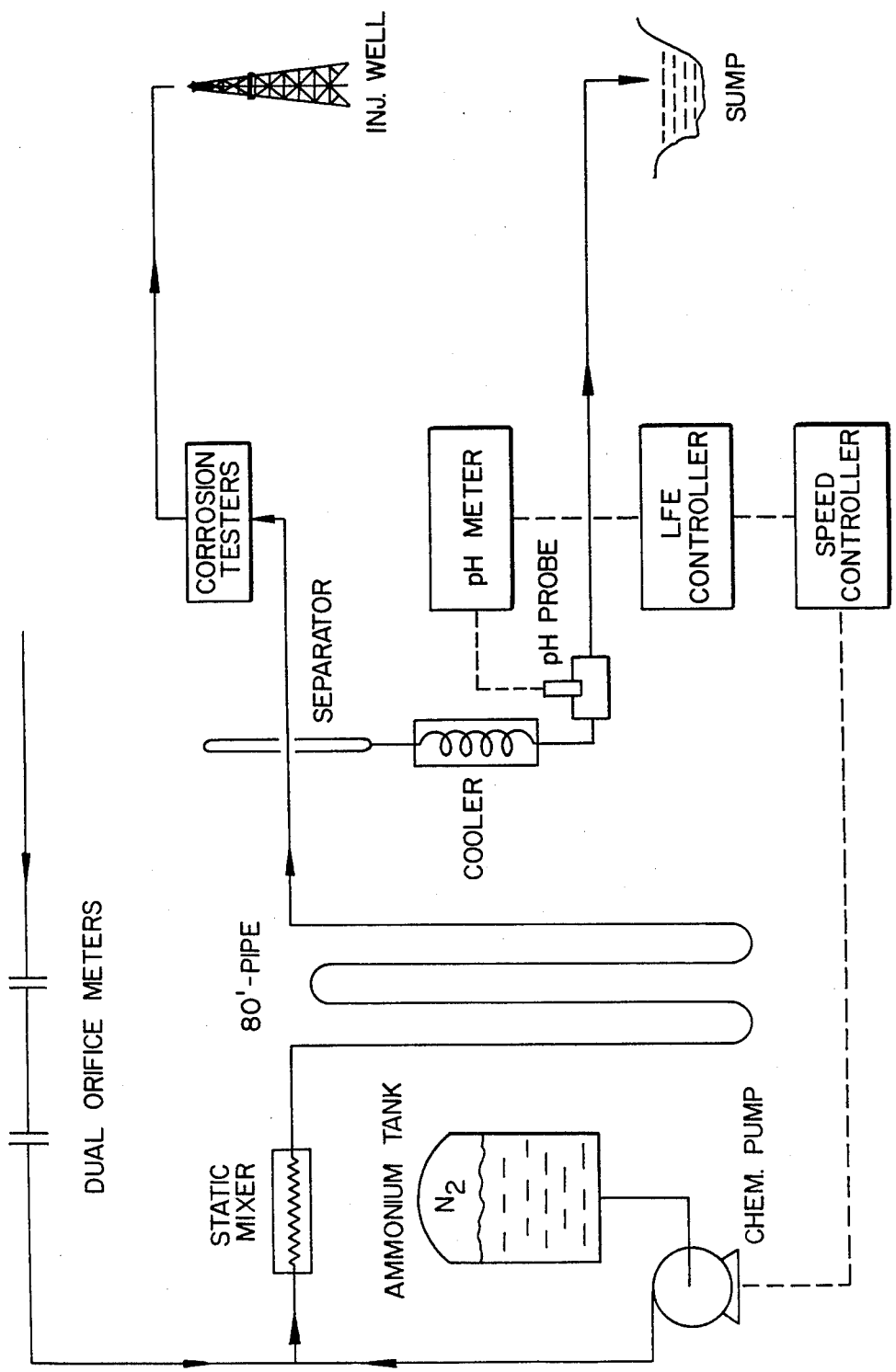
FIG._1.

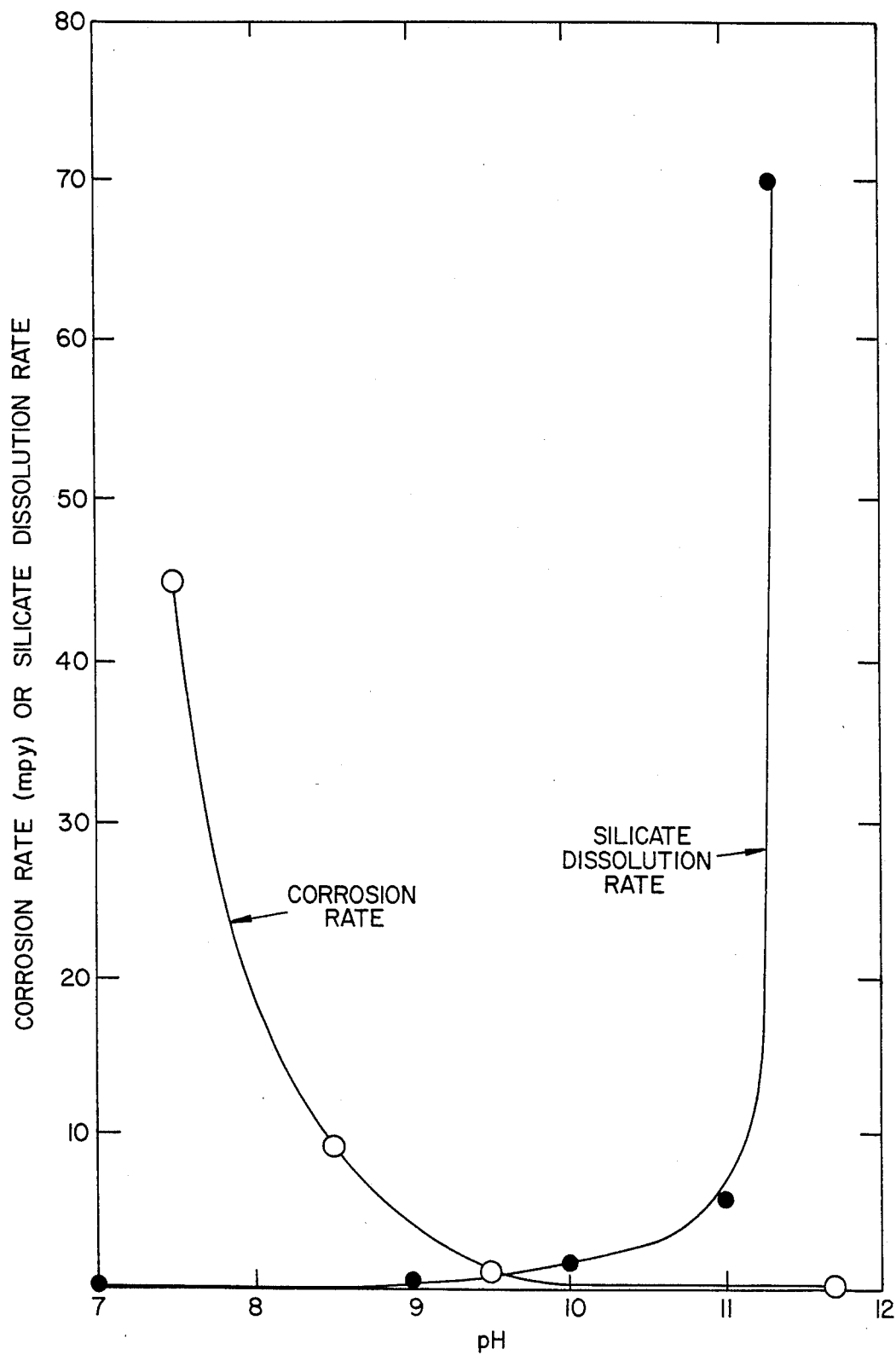
FIG._2.

METHOD FOR CONTROLLING ROCK DISSOLUTION AND PIPE CORROSION DURING OIL WELL STEAM INJECTION

CROSS-REFERENCE TO RELATED APPLICATION

This is a continuation of application Ser. No. 848,662, filed Apr. 4, 1986, now abandoned, which in turn is a continuation-in-part of application Ser. No. 654,331, filed Sept. 24, 1984, now abandoned and is a continuation-in-part of application Ser. No. 728,063, filed Apr. 29, 1985.

The present invention relates to a method for inhibiting rock dissolution during steam injection, such as gravel pack dissolution and carbonate and silicate formation dissolution. More particularly, the invention relates to a method for preserving the reservoir rock or gravel packing in oil wells being subjected to steam enhanced oil recovery techniques.

BACKGROUND OF THE INVENTION

In the production of crude oil from wells, steam injection has been used to recover immobile heavy oils and to enhance the oil recovery from older wells where the natural field pressures are too low for unassisted production.

Steam stimulation and steam flooding are techniques generally used in reservoirs of high-viscosity oil. The techniques involve injection into the well of a high temperature steam (approximately 250° C. or greater) in cycles of thousands of cubic meters at a time. Steam used in enhanced oil recovery operations is a fluid which is a mixture of a vapor phase and a liquid phase. The quality of this steam generally ranges from 60–80%. Thus, large quantities of liquid water are concurrently injected into the well bore with the vapor phase.

A typical oil well consists of a casing which lines the inside surface of the well bore and a length of tubing which extends downwardly through the casing. The casing serves to protect the tubing in the event of damage to the latter. Sucker rods extend through the tubing and terminate in a pump which reciprocates in the tubing and forces the oil upwardly therethrough. The lower end of the tubing extends into the oil zone and has perforations therein through which the oil flows thereinto.

Many wells which are subjected to steam stimulation have the lower end of the tubing filled with a gravel pack. A liner is positioned on top of the gravel pack and serves as a seat for the oil pump. The function of the gravel pack is to filter and prevent sand from being produced with the well fluid. The sand is erosive and if not filtered, would damage the pump. The gravel used to pack the well consists of granular sand grains. This material is principally quartz or silica.

Silica has a very low solubility in water at neutral pH and low temperatures, but this solubility rises sharply as temperature and pH are increased. For pH values above 11.0 and temperatures above 177° C., the dissolution rates are orders of magnitude higher than at neutral/ambient conditions.

When groundwater or river or lake water is used in a steam generator to generate steam, the gaseous vapor phase of the steam, and the residual liquid phase of the steam have undesirable reaction characteristics with the reservoir rocks. The residual liquid water phase produced in a steam generator generally has a pH in excess of 11.0. The gaseous or vapor phase of the steam, when condensed, has an acidic pH of about 4.0–4.5. This partitioning is due to the $CO_2$ contained in the source water which is volatile and enters the vapor phase leaving the residual liquid phase deficient in anionic components and thus produces a pH rise proportional to the lost anionic carbonate species. The presence of $CO_2$ in the vapor phase produces a correspondingly low pH in the liquids condensed from the vapor phase.

Coupled with the high fluid temperatures, both the residual liquid phase and the liquids from the condensed vapor phase are capable of rapidly dissolving the gravel packs, such as quartz-rich sands or bauxite with its associated impurities, or reservoir rocks, such as sandstone, carbonate, diatomite, porcellanite and the like. In the event of failure of the gravel pack, the well begins to produce sand with the eventual shut-down of the well. Alternatively, the formation collapses and the permeability is reduced.

Not only is the rate of silica dissolution quite rapid, but the water in the well becomes saturated within a short distance from the point at which the fluid contacts the surface of the silica. This is significant in that the dissolution of silica tends to be localized rather than diffused over a wide area of the zone, resulting in the face of the zone receding significantly.

In addition to the dissolution of the gravel pack due to the large quantities of water injected, there is a danger of the face of the formation also being dissolved. If this occurs to a sizable extent, the formation caves in and even the tubing or the casing could collapse and result in the loss of the well.

Still further, these large silica or carbonate losses at the well bore may precipitate out as the fluid reaches supersaturated conditions as it passes through the zone. The precipitation of the silica or carbonate in the zone may result in loss of zone permeability and a resultant shut-in.

The costs resulting from such well failures are imposing. Recently, one large oil producer estimated a well failure rate of 34% due to failure of gravel packing or zone related problems due to steaming. The approximate cost of reworking a well presently runs over $35,000. Increasing the time between the workovers would realize significant savings.

Dissolution of the gravel pack has been shown to be primarily a function of the pH and temperature of the injected liquid-phase water. Prior attempts at solution of the problem have focused on these aspects. For example, by keeping the pH of the injected hot water below 10, gravel pack dissolution can be decreased sharply. This may be accomplished by (1) selection of feed waters having low total carbonate concentrations (less than 10 mg total carbonate/L), (2) treating the feed water with HCl to yield the desired effluent pH, (3) using a total deionizer to remove both cations and anions from the feed water, or (4) protectively coating the gravel and/or reservoir rocks.

With regard to the first proposed solution, selection of feed waters is often impractical as the large quantities of water used are not available from a choice of sources. With regard to the second proposed solution, the use of HCl to neutralize the bicarbonate alkalinity suffers from considerations of cost as well as feasibility of the method. That is, addition of too much acid will cause severe corrosion of the steam generator and too little with result in insufficient depression of the pH to alleviate silica loss. With regard to the third proposed solution, the cost of a total deionizer is prohibitive, both in terms of capital costs as well as daily maintenance costs. With regard to the fourth proposed solution, complete coating of the gravel with a material, such as soybean lecithin described in U.S. Pat. No. 4,323,124, is not assured and driving the material out into the reservoir toward the production well is impractical. Furthermore, this patent does not address the problems of formation dissolution out in the formation away from the well bore.

U.S. Pat. No. 3,438,443 discloses another approach for a solution to the problem through the use of alkali metal silicates to saturate the water phase with silica and thus, hopefully, preventing the dissolution of siliceous formation material. However, alkali metal silicates are costly and the process also requires careful pH control.

Still other oil recovery processes as described in U.S. Pat. Nos. 3,500,931; 4,222,439; and 4,223,731 utilize chemicals, such as ammonium hydroxide, ammonium bisulfite, ammonium sulfite in separate injection steps to enhance oil recovery. However, these processes utilize the chemicals in a separate step, generally not including steam, and do not recognize the problems associated with the pH partitioning between the vapor phase of the steam and the residual water phase of the steam during the steps that include steam injection. Still another oil recovery process described in U.S. Pat. No. 4,441,555 utilizes a carbonated water flooding step before a steam drive to enhance the recovery of viscous oil. This process also does not recognize the problems of pH partitioning during steps that require a steam drive.

Thus, it would be highly desirable to have a process of reducing the pH of the residual liquid phase of the steam. It would also be desirable to have a process of solving the previously not addressed problem of the gravel pack and formation dissolutions caused by the decrease in the pH of the vapor phase of the steam (upon condensation) in a steam enhanced oil recovery process. A further optional and beneficial advantage would be to have the process compatible with steam-surfactant enhanced oil recovery processes. A process meeting these criteria would have additional desirable benefits obvious to the ordinary skilled artisan, such as uses for in situ solution mining, and the like.

SUMMARY OF THE INVENTION

The dissolution of silica from the gravel pack in the well bore area and the dissolution of silica and carbonate from the formation is caused by a chemical reaction between water and silica, silicate minerals, and carbonate minerals which is catalyzed by heat and either alkalinity or acidity or both. According to the present invention, these dissolutions are inhibited by adding a salt, comprising a volatile cationic component and a nonvolatile anionic component, to the steam generator feed water to reduce the pH of the residual liquid phase of the steam to within the range of from 8 to 10, preferably in the range of from 8.5 to 9.5; monitoring the pH of the residual liquid phase; and continually adjusting the addition of the salt to maintain the pH within the range of from 8.0 to 10.0. A nonvolatile anionic component is an anion which remains in the residual liquid phase of the steam. A volatile cationic component is a cation capable of moving into the vapor phase of the steam. The concentration of the salts is dictated by the concentration of the total carbonate species and the pH of the feed water. Total carbonate species includes $H_2CO_3$, $HCO_3^-$, and $CO_3^=$. The stoichiometric amount of the appropriate salts with respect to the total carbonate species in the steam feed water is added to optimize the pH decrease in the residual liquid phase of the steam while minimizing the cost of the required chemicals. The amount of salts added to the feed water is controlled to cause the pH of the residual liquid phase to be in the range of from 8 to 10, preferably in the range of from 8.5 to 9.5. When the pH of the residual liquid phase is above 10, the dissolution rate of silica becomes unacceptably high. When the pH of the residual liquid phase is below 8 the corrosion rate of the well pipe becomes unacceptably high. In addition to steam drive enhanced oil recovery processes, the invention can be used with steam dump-/heap leaching operations in mining and for steam in situ mineral mining.

BRIEF DESCRIPTION OF THE DRAWINGS

FIG. 1 is a schematic diagram of the field test facility used to test this invention.

FIG. 2 is a plot of the effect of pH on corrosion rate and silicate dissolution rate.

DETAILED DESCRIPTION OF THE INVENTION

The problems of gravel pack and silicate formation dissolution are a function of the pH of the steam generator feed water and its carbonate concentration. For example, the dissolution of the bicarbonate ion upon heating according to the formula:

| Feed Water | Vapor Phase | Liquid Phase | |
|---|---|---|---|
| $HCO_3^-$ ⇌ | $CO_2$ + | $OH^-$ | (1) | causes the pH of the vapor phase of the steam (upon condensation) to drop and the pH of the residual liquid phase to increase. During steam injection, the vapor phase of the steam typically enters the upper part of the production interval while the alkaline liquid residual fluid phase enters the lower part of the production interval. However, regardless of where the vapor or liquid phases of the steam enter the production interval, the pH partitioning causes gravel pack and formation dissolution and increases overall maintenance costs and time.

This problem is simply and effectively addressed by adding to the steam generator water a sufficient amount of a salt to reduce the pH of the residual liquid phase of the steam to within the range of from 8.0 to 10.0, monitoring the pH of the residual liquid phase and continually adjusting the addition of the salt to maintain the pH within the range of from 8.0 to 10.0.

The pH of the residual liquid phase of the steam is measured at about 120° F. The addition of the ammonium salt can be controlled based on either the pH measured at 120° F. or, preferably, the effective pH at the temperature of the injected steam. The effective pH at the temperature of the injected steam can be calculated by solving the system of equations describing the equilibrium relations among the controlling aqueous components in the fluid phase and using the appropriate thermodynamic data and mass balance constraints.

The salt must have a volatile cationic component and a nonvolatile anionic component. Useful salts are ammonium salts that include ammonium sulfate, ammonium chloride, ammonium, ammonium hydroxide, ammonium acetate, ammonium nitrate and mixtures thereof, having a volatile cationic, i.e., $NH_4^+$, and a nonvolatile anionic component, i.e., $SO_4^=$, $Cl^-$, $OH^-$, $CH_3COO^-$, $NO_3^-$. In view of its cost advantage, ammonium sulfate is preferred, although ammonium chloride is preferred if a more soluble salt is required. The ammonium cation decomposes and ammonia moves into the vapor phase, according to the formula:

| Feed Water | | Vapor Phase | | Liquid Phase | |
|---|---|---|---|---|---|
| $NH_4^+$ | $\rightleftarrows$ | $NH_3$ | + | $H^+$ | (2) |

The $NH_3$ increases the pH of the vapor phase of the steam upon condensation and the $H^+$ neutralizes the $OH^-$ in the liquid phase and reduces its alkaline pH. The nonvolatile anionic component also drives the equilibrium of the residual liquid phase of the steam toward a reduced pH.

The amount of salt required initially depends on the total carbonate ion concentration in the steam generator feed water. This concentration can be determined by standard carbonate titration methods, such as $CO_2$ coulometric methods. The desired initial amount of the salt is added to the feed water entering the steam generator to reduce the pH of the residual liquid phase of the steam to within the range of from 8.0 to 10.0, preferably within the range of from 8.5 to 9.5.

Once the pH has been reduced to the desired range, the pH must be maintained within that range. This is accomplished by monitoring the pH of the residual liquid phase and continually adjusting the addition of the salt to maintain the desired pH.

Oxygen in the feedwater to the steam generator cannot be tolerated since severe corrosion will occur. A chemical oxygen scavenger, such as sodium sulfite, should be used in the feedwater to keep the oxygen concentration in the feedwater below 30 ppb.

EXAMPLE 1

FIG. 1 is a schematic diagram of a field test facility to test this invention. The test facility can be divided into three parts: the injection system, the automatic pH control system, and the corrosion testers.

The Injection System

The feedwater used in this experiment was well water which had been softened and pipelined to the steam generators. The major ion species present in the feedwater were sodium, chloride, sulfate, and bicarbonate. Their concentrations were nearly constant during the experimental period. The average concentrations of bicarbonate and sulfate were 272 mg/l and 1263 mg/l, respectively. The steam flow rate and quality were continuously monitored using a duel orifice meter system.

Ammonium sulfate was used in this field trial because of the high concentration of sulfate in the feedwater. The amount of sulfate that was added to the water as ammonium sulfate represented only a 15% increase in the overall sulfate concentration. 240 pounds of ammonium sulfate was mixed with 570 gallons of water to obtain a solution of approximately 0.8M in ammonium ion. The dissolved oxygen which saturates the chemical solution during mixing was removed using sodium sulfite as an oxygen scavenger. In addition to the oxygen scavenger, a nitrogen blanket was kept on top of the chemical solution. Nitrogen was injected into the tank at approximately twice the rate of chemical solution output.

Ammonium solution was pumped to the steam line with a pump having a d-c variable speed motor. An in-line 2-inch static mixer was used to mix the ammonium solution with the steam. In order to provide an adequate residence time for ammonium salt to decompose, an 80-foot long extension pipe was added to the line. With the extension, the steam residence time increased from 0.3 seconds to 3–4 seconds.

Automatic pH Control System

The pH of the liquid fraction of the steam was used to determine the rate of chemical injection. The system consisted of a separator, a pH meter, a microprocessor, and a pump motor speed controller.

The separator was made of two one-inch diameter pipes welded to a section of three-inch steam injection line. The liquid collection pipe was welded to the bottom of the steam line and the vapor collection pipe was welded to the top. The vapor-liquid separation took place within the one-inch pipes. Good separation was achieved as long as the flow rates were kept sufficiently low. The fluids then flowed from the separator through cooling condensers after which the fluid was sampled as warm water.

After the fluid was cooled, the liquid fraction of the steam was allowed to flow continuously from the vapor-liquid separator into a bronze vessel containing pH electrodes. The pH of the solution was monitored with an industrial pH meter system.

The output from the pH meter was sent to a strip chart recorder and a microprocessor proportional controller which was programmed to maintain a specific pH.

The controller output then went to a speed controller which amplified the signal and supplied the appropriate power to alter the speed of the chemical pump motor that pumped the ammonium solution into the steam line.

Corrosion Testers

The corrosion test system was placed directly in the steam line just downstream of the 80 foot pipe. Three methods were used to determine the corrosion rate: corrosion coupons, corrosion nipples, and a corrosimeter.

Although the dissolution of silica decreased as the pH of the residual liquid phase decreased, the corrosion of the well pipe increased dramatically when the pH decreased below 8.0. (See FIG. 2) Therefore, the pH of that phase should be kept above 8.0.

Since the titration method is difficult to perform in the field, once the carbonate concentration is determined, the amount of ammonium salt to be added is adjusted by monitoring the pH of the residual liquid phase of the steam. If the pH is too high, then more salt is added. If the pH is too low, then less ammonium salt is added. The pH should be adjusted through the addition of the compound to the range of from 8.0 to 10 for the residual liquid phase.

The following table illustrates suitable stoichiometric concentrations of ammonium sulfate and ammonium chloride for steam generator feed waters having total carbonate concentrations from 50 ppm to 1000 ppm.

TABLE

| Steam Feed Water Carbonate Conc. (ppm) | Ammonium Sulfate g/bbl | Ammonium Sulfate g/l | Ammonium Chloride g/bbl | Ammonium Chloride g/l |
|---|---|---|---|---|
| 50 ppm | 8.6 | 0.054 | 6.97 | 0.044 |
| 250 ppm | 43.0 | 0.27 | 34.8 | 0.22 |
| 1000 ppm | 172. | 1.08 | 139 | 0.88 |

For a typical 350-barrel per day (BPD) steam injection project with a carbonate concentration of 250 ppm, the daily ammonium sulfate salt consumption is about 15 kilograms. The chemical cost is only about 1.5 cents per barrel of injected steam. However, this causes about a 20-fold decrease in the silica dissolution rate at an adjusted pH of about 9.1.

The process is suitable for use within cyclic steam injection or patterned steam injection involving the use of injection wells and production wells, i.e. seven-spot, five-spot, nine-spot, their inverted forms, and the like. In addition, it can be used with surfactants and steam-foam drives. Suitable surfactants are known anionic, cationic or nonionic surfactants. Preferred surfactants for steam-foam enhanced oil recovery drives are known as alpha olefin sulfonates and their dimers as described in U.S. Pat. No. 3,721,707, incorporated herein by reference. Furthermore, the steam drive does not have to be continuous so long as any displacing medium does not substantially alter the preferred pH of the residual liquid phase of the steam in the formation.

EXAMPLE 2

Experiments with a made-up feed water containing 0.004M $NaHCO_3$, 0.004M NaCl, and 0.001M $MgSO_4$ indicate that the residual liquid phases pH is reduced from a pH of about 11.1–11.4 to about 9.6 with the addition of 50% of the stoichiometric amount of $(NH_4)_2SO_4$ added and further reduced to a pH of about 8.8–9.1 with an addition of 100% of the stoichiometric amount of ammonium sulfate.

The pH of the condensed vapor phase increased from about pH 4.5–4.8 without the ammonium sulfate to about pH 8.5.

The addition of the stoichiometric amount of $NH_4Cl$ to a similar made-up feed water caused the pH of the residual water to drop from about pH 11.1–11.4 to about pH 9.2 and increased the condensed vapor phase pH from about pH 4.5–4.8 to about pH 8.4.

Actual experimental field work produced better results. Water used to feed steam generators in a steam flood had a carbonate concentration roughly from about 50 ppm to about 100 ppm and a residual fluid pH of about 11.5 and a condensed vapor phase pH of about 4.5. The addition of about 0.6 g/l of $(NH_4)_2SO_4$ increased the pH of the condensed vapor to about pH 6 and reduced the pH of the residual liquid to about pH 7.5. Furthermore, the pH of both phases could be adjusted by adjusting the addition of the ammonium salt.

The process has been described with respect to particularly preferred embodiments. Modifications which would be obvious or apparent to the ordinary skilled artisan are contemplated to be within the scope of the invention. For example, the invention is suitable to reduce the dissolution of not only sand or gravel packs but also carbonate formations and siliceous formations, such as sandstone, diatomite, and porcellanite.

What is claimed is:

1. In a process for the recovery of hydrocarbons from a silicate or carbonate containing hydrocarbon-bearing formation penetrated by at least one steam injection well and at least one production well spaced therefrom, the process which inhibits formation dissolution while preventing pipe corrosion which comprises:
   (a) injecting steam into said steam injection well to displace hydrocarbons toward said production well, said steam produced from a water having added thereto a sufficient amount of a salt to reduce the pH of the residual liquid phase of said steam to within the range of from 8.0 to 10.0, said salt comprises a volatile cationic component and a nonvolatile anionic component;
   (b) monitoring the pH of said residual liquid phase and continually adjusting the addition of said salt to maintain the pH within the range of from 8.0 to 10.0; and
   (c) producing said hydrocarbons from said production well.

2. The process according to claim 1 wherein said salt is an ammonium salt.

3. The process according to claim 2, wherein said ammonium salt is selected from the group consisting of ammonium sulfate, ammonium chloride, ammonium hydroxide, ammonium acetate, ammonium nitrate, and mixtures thereof.

4. The process according to claim 3 wherein the ammonium salt is ammonium sulfate.

5. The process according to claim 3 wherein the ammonium salt is ammonium chloride.

6. The process according to claim 3 wherein the pH ranges in steps (a) and (b) of claim 1 are both from 8.5 to 9.5.

7. The process according to claim 6 wherein said steam injection well contains a gravel pack.

8. The process according to claim 7 which further comprises adding a surfactant selected from the group consisting of anionic, cationic and nonionic surfactants to the injected steam.

9. The process according to claim 8 wherein said steam has a temperature of at least about 150° C.

10. In a process for the recovery of hydrocarbons from a silicate or carbonate containing hydrocarbon-bearing formation penetrated by at least one production well spaced therefrom, the process which inhibits formation dissolution while preventing pipe corrosion which comprises:
   (a) injecting steam into said production well, said steam produced from a water having added thereto a sufficient amount of a salt to reduce the pH of the residual liquid phase of said steam to within the range of from 8.0 to 10.0, said salt comprises a volatile cationic component and a nonvolatile anionic component;
   (b) monitoring the pH of said residual liquid phase and continually adjusting the addition of said salt to maintain the pH within the range of from 8.0 to 10.0; and then
   (c) producing said hydrocarbons from said production well.

11. The process according to claim 10 wherein said salt is an ammonium salt.

12. The process according to claim 11 wherein said ammonium salt is selected from the group consisting of ammonium sulfate, ammonium chloride, ammonium hydroxide, ammonium acetate, ammonium nitrate, and mixtures thereof.

13. The process according to claim 12 wherein the ammonium salt is ammonium sulfate.

14. The process according to claim 12 wherein the ammonium salt is ammonium chloride.

15. The process according to claim 12 wherein the pH ranges in steps (a) and (b) of claim 10 are both from 8.5 to 9.5.

16. The process according to claim 15 which further comprises adding a surfactant selected from the group consisting of anionic, cationic and nonionic surfactants to the injected steam.

17. In a process for the recovery of hydrocarbons from a silicate or carbonate containing hydrocarbon-bearing formation penetrated by at least one steam injection well and at least one production well spaced therefrom, the process which inhibits formation dissolution while preventing pipe corrosion which comprises:
  (a) injecting steam into said steam injection well to displace hydrocarbons toward said production well, said steam produced from a water having added thereto a sufficient amount of an ammonium salt selected from the group consisting of ammonium sulfate and ammonium chloride to reduce the pH of the residual liquid phase of said steam to within the range of from 8.5 to 9.5;
  (b) monitoring the pH of said residual liquid phase and the temperature of the steam as it is injected in the steam injection well;
  (c) continually calculating the effective pH of said injected steam;
  (d) continually adjusting the addition of said ammonium salt to maintain the effective pH of said injected steam within the range of from 8.5 to 9.5; and
  (e) producing said hydrocarbons from said production well.

18. A method for inhibiting silica dissolution while preventing pipe corrosion for use in the vicinity of a well penetrating a hydrocarbon-containing formation, comprising:
  (a) injecting steam into said well, said steam having a liquid phase and a vapor phase, and including an effective amount of a salt to reduce the pH of said liquid phase of said steam to a range of about 8.0 to about 10.0 said salt comprising a volatile cationic component and a nonvolatile anionic component; and
  (b) monitoring the pH of said liquid phase of said steam and continually adjusting the addition of said salt to maintain the pH of said liquid phase of said steam within the range of from about 8.0 to about 10.0.

19. A method, according to claim 18, wherein said salt comprises an ammonium salt.

20. A method, according to claim 19, wherein said ammonium salt is selected from the group consisting of ammonium sulfate, ammonium chloride, ammonium hydroxide, ammonium acetate, ammonium nitrate, and mixtures thereof.

21. A method, according to claim 20, wherein the ammonium salt is ammonium sulfate.

22. A method, according to claim 20, wherein the ammonium salt is ammonium chloride.

23. A method, according to claim 18, wherein the pH ranges in steps (a) and (b) of claim 18 are both from 8.5 to 9.5.

24. A method, according to claim 23, wherein said well contains a gravel pack.

25. A method, according to claim 24, which further comprises adding a surfactant selected from the group consisting of anionic, cationic, and nonionic surfactants to said steam.

26. A method, according to claim 25, wherein said steam has a temperature of at least about 150° C.

27. A method of claim 18 wherein said well is converted to a production well and hydrocarbons are produced therefrom.

28. The method of claim 18 where a spaced apart production well is used to recover hydrocarbons from said formation.

29. A method for recovering hydrocarbons from a silicate or carbonate containing hydrocarbon-bearing formation penetrated by at least one well, wherein said method inhibits formation dissolution while preventing pipe corrosion, said method comprising the steps of:
  (a) injecting steam into said well, said steam produced from a water having added thereto an effective amount of a salt to reduce the pH of the residual liquid phase of said steam to within the range of from about 8.0 to about 10.0, said salt comprising a volatile cationic component and a nonvolatile anionic component;
  (b) monitoring the pH of said residual liquid phase of said steam and continually adjusting the addition of said salt to maintain the pH of said liquid phase within the range of from about 8.0 to about 10.0;
  (c) producing said hydrocarbons.

30. A method, according to claim 29, wherein said salt is an ammonium salt.

31. A method, according to claim 30, wherein said ammonium salt is selected from the group consisting of ammonium sulfate, ammonium chloride, ammonium hydroxide, ammonium acetate, ammonium nitrate, and mixtures thereof.

32. A method, according to claim 31, wherein the ammonium salt is ammonium sulfate.

33. A method, according to claim 31, wherein the ammonium salt is ammonium chloride.

34. A method, according to claim 31, wherein the pH ranges in steps (a) and (b) of claim 29 are both from 8.5 to 9.5.

35. A method, according to claim 34, which further comprises adding a surfactant selected from the group consisting of anionic, cationic and nonionic surfactants to said steam.

36. The method of claim 29 where said at least one well is converted to a production well and hydrocarbons are recovered therefrom.

37. The method of claim 29 where said at least one well is an in injection well and hydrocarbons are recovered from a spaced apart production well penetrating said formation.

38. The method of claim 29 where said salt is selected from the group consisting of ammonium sulfate and ammonium chloride to reduce the pH of said liquid phase to within the range of from about 8.5 to about 9.5; monitoring the pH of said residual liquid phase and the temperature of steam as it is injected into said well; continually calculating the effective pH of said injected steam; and continually adjusting the addition of said ammonium salt to maintain the effective pH of said injected steam within the range of from about 8.5 to about 9.5.

* * * * *

Disclaimer 4,714,112.—*Andrew Nigrini*, La Habra Heights; *Liming Hseuh*, Beuna Park, both of Calif. METHOD FOR CONTROLLING ROCK DISSOLUTION AND PIPE CORROSION DURING OIL WELL STEAM INJECTION. Patent dated Dec. 22, 1987. Disclaimer filed Oct. 13, 1989, by the assignee, Chevron Research Company.

Hereby enters this disclaimer to the entire term of said patent.
*[Official Gazette January 2, 1990]*